(12) United States Patent
Tanaka et al.

(10) Patent No.: US 6,287,163 B2
(45) Date of Patent: Sep. 11, 2001

(54) METHOD FOR APPLYING SHADING COATINGS TO LAMPS

(75) Inventors: Kazuhisa Tanaka, Osaka; Takeshi Saitoh, Hyogo; Masaru Ikeda, Osaka; Tomoyuki Seki, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/726,844

(22) Filed: Nov. 30, 2000

Related U.S. Application Data

(62) Division of application No. 09/227,560, filed on Jan. 8, 1999.

(30) Foreign Application Priority Data

Feb. 4, 1998 (JP) .................................... 10-22466

(51) Int. Cl.$^7$ .................................................. H01J 61/35
(52) U.S. Cl. ............................. 445/22; 445/58; 427/376.2
(58) Field of Search ...................... 445/22, 58; 427/376.2

(56) References Cited

U.S. PATENT DOCUMENTS 5,012,479 * 4/1991 Hug et al. ............................... 372/56

FOREIGN PATENT DOCUMENTS

| 0 702 395 A2 | 3/1996 | (EP) . |
| 0 702 396 A2 | 3/1996 | (EP) . |
| 05-325786 | 12/1993 | (JP) . |
| 07-262968 | 10/1995 | (JP) . |
| WO 95/31001 | 11/1995 | (WO) . |

* cited by examiner

*Primary Examiner*—Kenneth J. Ramsey
(74) *Attorney, Agent, or Firm*—Merchant & Gould P.C.

(57) ABSTRACT

A greensheet comprising an inorganic pigment and an inorganic matrix component is applied to a surface of a glass substrate and fired for fixing. The formed shading film has a portion whose thickness is 90% or more of the maximum thickness of the shading film within the range of 0.5 mm from an edge of the shading film. Thus, a shading film that has distinct end faces and has an excellent thickness uniformity can be formed with a good positional accuracy. Therefore, a lamp having a highly precise light distribution property can be obtained. In addition, a lamp having such a property can be obtained with a few steps and at a low cost.

8 Claims, 6 Drawing Sheets

METHOD FOR APPLYING SHADING COATINGS TO LAMPS

This application is a divisional of application Ser. No. 09/227,560, filed Jan. 8, 1999, which application(s) are incorporated herein by reference.

FIELD OF THE INVENTION

The present invention relates to a lamp having a shading film and a method for manufacturing the same. More particularly, the present invention relates to a lamp in which a greensheet as a shading film is applied and fired for integration and a method for manufacturing the same.

BACKGROUND OF THE INVENTION

Conventionally, a shading film is formed on a discharge lamp, a tungsten halogen lamp or the like. An example of a discharge lamp will be described below. A discharge lamp having a wattage as low as a lamp power of 35 W is put to practical use. Since the discharge lamp is small and has a high efficiency, it is used for an automobile headlight, a light source for the back light of a liquid crystal projector, or the like.

When the discharge lamp is used for an automobile headlight or a light source for the back light of a liquid crystal projector, the discharge lamp is combined with a reflecting mirror. In recent years, a discharge lamp using quartz, which cuts off ultraviolet rays, for an outer tube to prevent the reflecting mirror from deteriorating due to ultraviolet rays emitted from the discharge lamp is known. In general, in order to achieve a proper light distribution by combining the reflecting mirror and the discharge lamp, the position of the light-emitting portion, that is, the arc, should be controlled with a very high precision with respect to the reflecting mirror. However, since the arc, which is the light-emitting portion of the discharge lamp, is affected by such factors as the shape of the arc tube, pressure, tube voltage, and tube current, it is difficult to control the position of the light-emitting portion mechanically in the same manner as the filament of a bulb or the like.

Accordingly, a method for obtaining a precise light distribution by forming a shading film on the outer tube and optically cutting a part of the arc whose position is difficult to control is proposed. With this method, the light distribution depends on the accuracy of the position of the shading film rather than the arc. Therefore, it is necessary to coat the outer tube with the shading film with a good positional accuracy.

Conventional lamps have an arc tube surrounded by an outer tube. An outer lead extends from each electrode to each contact of a base to which the neck-shaped portion of the arc tube is fixed. The power supply line of one outer lead extends along the outer surface of the outer tube. The outer tube is coated with a shading film near its neck-shaped portion and on the side distant from the power supply line by using a brush or an ink jet. Also, the outer tube is coated with a belt-shaped shading film at both ends of the discharge path between the electrodes and on the side facing the power supply line (Japanese Patent Application No. (Tokuhyo Hei) 9-500489).

However, with such a method for forming a shading film by using a brush or an ink jet, coating with a shading film must be performed by a machine. Therefore, the machine cost and the coating time are necessary. In addition, the control of a coating material for the shading film and the coating step are complicated.

Furthermore, with the above method, variations in the thickness of the shading film occur easily during coating. Also, since the coating material is a liquid, the thickness of the border portion of the formed shading film is smaller than that of the central portion of the shading film. Therefore, the shading property of the border portion of the shading film and its vicinity after firing deteriorates. That is, there is a problem that the edge of the border portion of the shading film has a gentle slope structure. In the lamp that controls the light distribution by the shading film, the positional accuracy and linearity of the border portion of the shading film coated on the outer tube affect the light distribution significantly. Therefore, it is necessary to control the shading film, especially the border portion of the shading film, with a good positional accuracy.

SUMMARY OF THE INVENTION

In order to solve the conventional problems as described above, it is an object of the present invention to provide a lamp that provides a more precise light distribution property by making the border portion of the shading film steep, making the positional accuracy good, and ensuring the thickness uniformity of the shading film. It is another object of the present invention to provide a method for manufacturing such a lamp simply at a low cost.

In order to achieve the above objects, the present invention provides a lamp comprising a glass substrate and a shading film formed on a surface of the glass substrate, wherein the shading film is integrated with the surface of the glass substrate by applying a greensheet comprising an inorganic pigment and an inorganic matrix component to the surface of the glass substrate and firing the greensheet. Here, the greensheet means a precursor sheet that comprises an inorganic substance, such as ceramic or glass, as a matrix component and is used to obtain a sintered body. The greensheet is flexible and can be used by itself. Therefore, it is easy to prepare a greensheet having a uniform thickness ahead of time. Also, it is easy to pattern the greensheet into a predetermined shape previously by punching. In addition, since the greensheet has a smaller amount of an organic substance component than a coating material, the density of the sintered body is higher than in the case of baking the coating material. Furthermore, only a minor deformation occurs during sintering. Therefore, it is possible to make the border portion of the shading film steep, make the positional accuracy good, and ensure the thickness uniformity of the shading film. Thus, it is possible to make the light distribution property during lighting good. Furthermore, since the shading film of the present invention is formed by applying and firing a greensheet, the degree of freedom for a position where the shading film is formed improves, unlike the conventional shading film formed by using a brush or an ink jet. Therefore, the shading film can be formed in an optimum position, considering the light distribution property and the convenience of the manufacturing method. Thus, the light distribution property can be improved, and the lamp can be manufactured easily at a low cost.

It is preferable that the greensheet is patterned into a predetermined shape before being applied to the glass substrate, because a highly uniform shading film can be formed.

It is preferable that an edge of the shading film is steep. This makes the border portion (the end face) of the shading film more distinct, so that the light contrast can be clear at the edges of the shading film.

It is preferable that the inorganic pigment is at least one metal selected from the group consisting of iron, manganese, copper, chromium and cobalt, or a metal oxide thereof, because a shading film having a high shading property can be formed.

As the inorganic matrix component, a powder or fine particles of glass, earthenware, ceramics or the like can be used. The glass frit is preferable in view of the easiness of a heat treatment, because the glass frit is melted by heating to be easily integrated with the surface of the glass substrate. Here, the glass frit means glass or a powder or fine particles of the component of the glass.

The present invention provides a lamp comprising a shading film, wherein the shading film has a portion whose thickness is 90% or more of the maximum thickness of the shading film within the range of 0.5 mm from an edge of the shading film. According to this aspect, a shading film that has a distinct border portion (end face) and has only a minor nonuniformity in thickness can be formed with a good positional accuracy. This can make the light distribution property during lighting good.

It is preferable that the thickness of the shading film in the range of 0.5 mm and more inside from an edge of the shading film is 50% or more of the maximum thickness of the shading film, because a preferable shading property can be obtained.

It is preferable that the average thickness of the shading film in the range of 0.5 mm and more inside from an edge of the shading film is 10 to 100 μm, because a preferable shading property can be obtained.

It is preferable that the light transmittance in the range of 0.5 mm and more inside from an edge of the shading film is 6% or less of the light transmittance of a portion of the glass substrate without the shading film, because the shading property is excellent in this range.

The shading film can be provided on a surface of the arc tube of the lamp. More specifically, the shading film can be provided on at least one of the outer and inner surfaces of the arc tube.

The shading film can be provided on a surface of an outer tube covering the arc tube of the lamp. More specifically, the shading film can be provided on at least one of the outer and inner surfaces of the outer tube.

It is preferable that the lamp is a discharge lamp. In the discharge lamp, the control of the arc position is especially difficult. By applying the present invention, a more precise light distribution property can be obtained, and the effect of the present invention can be provided significantly.

The present invention provides a method for manufacturing a lamp including a glass substrate and a shading film formed on a surface of the glass substrate, comprising applying a greensheet that comprises an inorganic pigment and an inorganic matrix component and is patterned into a predetermined shape to a surface of a glass substrate, and firing the greensheet so that the greensheet is integrated with the surface of the glass substrate, thereby forming a shading film. According to this method, the lamp of the present invention can be manufactured efficiently with a few manufacturing steps.

It is preferable that the inorganic matrix component is a glass frit, because the glass frit is melted by heating to be easily integrated with the surface of the glass substrate.

It is preferable that the firing comprises calcination and main firing.

It is preferable that the calcination is performed in a temperature range for removing the organic component in the greensheet.

It is preferable that the calcination is performed in an oxidative atmosphere at a temperature of 200 to 600° C. According to the preferable example, the organic component in the greensheet can be removed efficiently.

It is preferable that the main firing is performed in an oxidative atmosphere at a temperature of 600 to 1,500° C. According to the preferable example, the greensheet can be baked onto the glass substrate for integration.

It is preferable that at least one surface of the greensheet is coated with an adhesive, because the greensheet can be applied to the glass substrate easily. Thus, the number of manufacturing steps is reduced. Therefore, a lamp having a good light distribution property can be manufactured at a low cost. In addition, the adhesive does not affect the light distribution property and the like because the adhesive is lost during firing.

It is preferable that the average thickness of the greensheet is in the range of 10 to 100 μm. According to the preferable example, a shading film having a preferable thickness can be obtained finally, so that a preferable shading property can be obtained.

Furthermore, by applying the above method to the manufacture of a discharge lamp, a more precise light distribution property can be achieved in a discharge lamp, whose arc position is difficult to control, with a few manufacturing steps and at a low cost. Therefore, the effect of the present invention can be provided significantly.

DETAILED DESCRIPTION OF THE INVENTION

The present invention will be described by way of a metal halide lamp, which is one type of discharge lamp.

Figure 1:
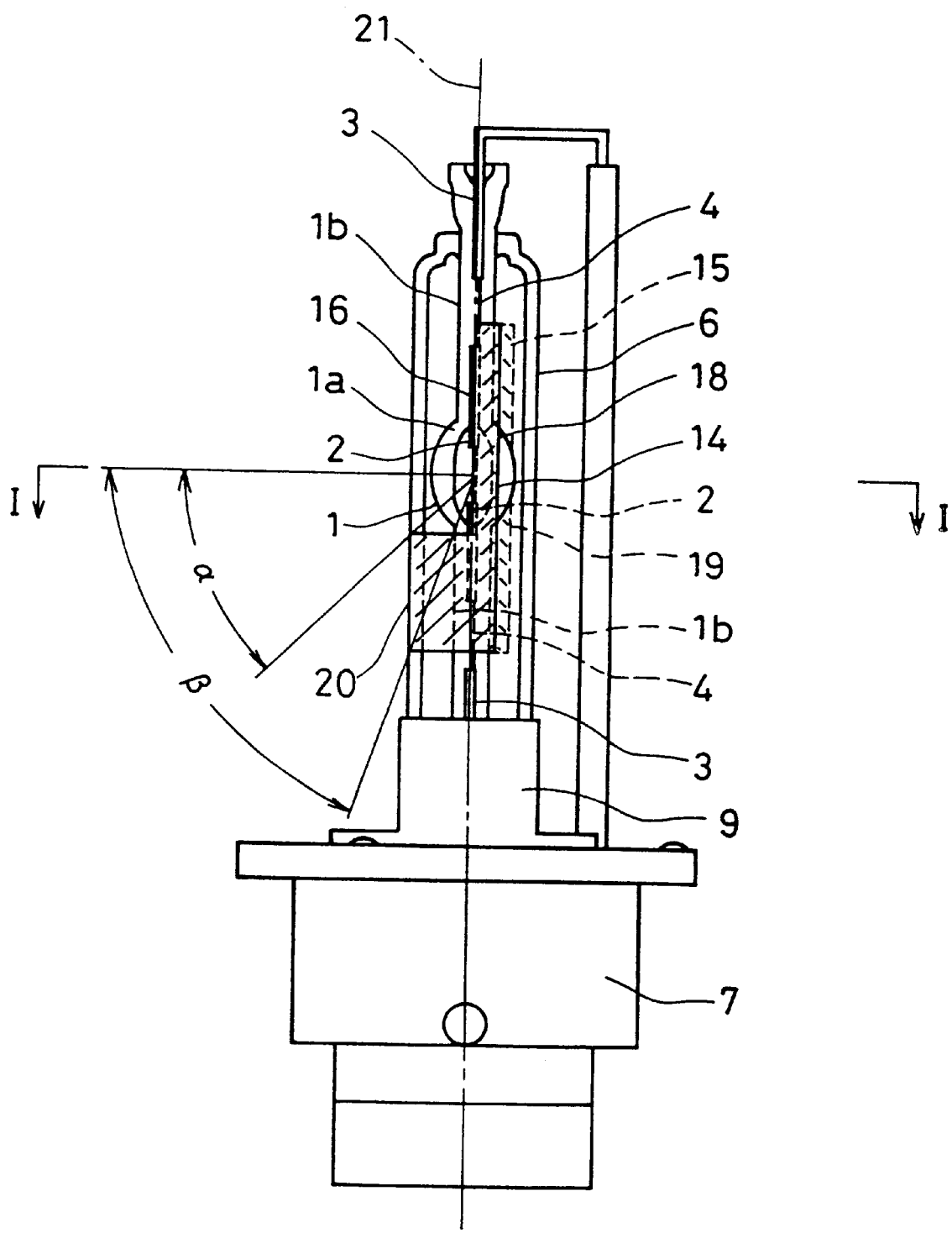
FIG. 1 is a front view of a metal halide lamp for a 35W automobile headlight in one embodiment of the present invention.
Figure 2:
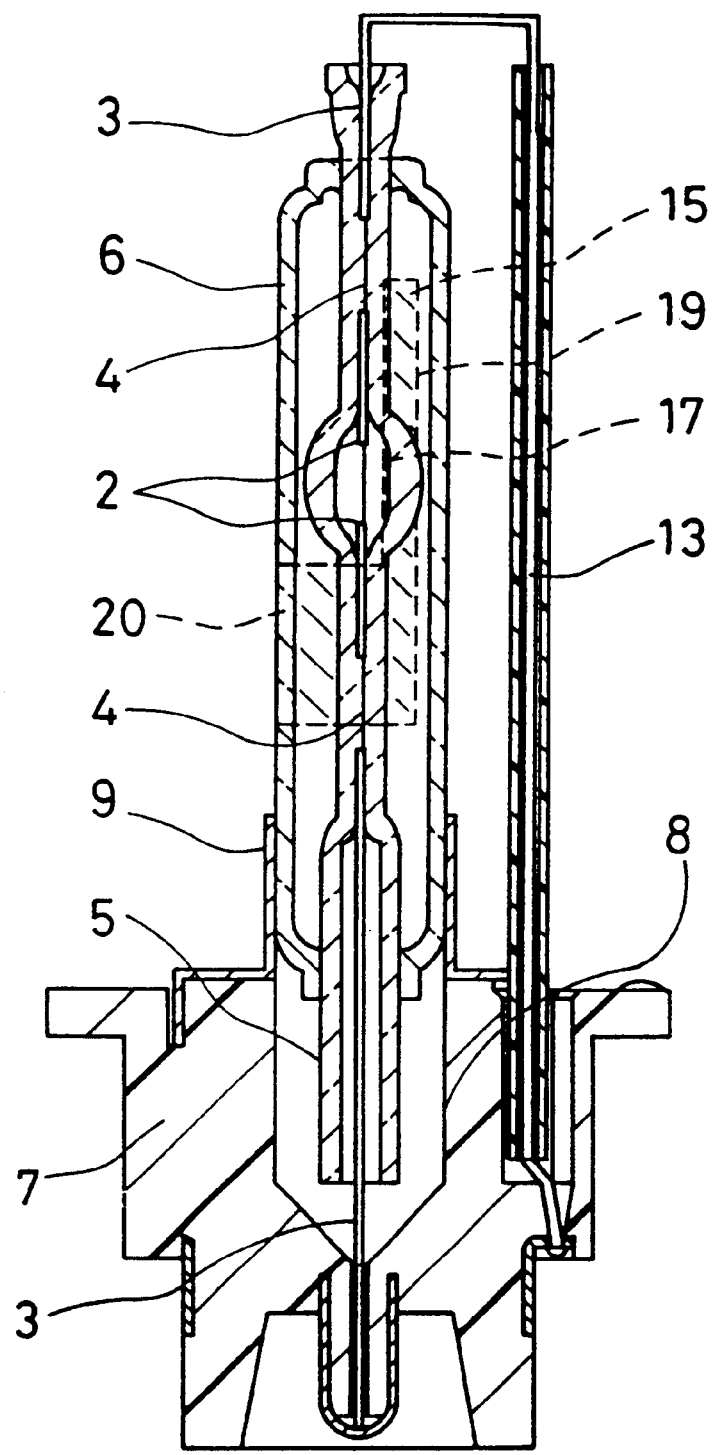
FIG. 2 is a front view in section taken along a plane that includes the axis 21 of the arc tube of the metal halide lamp in FIG. 1.
Figure 3:
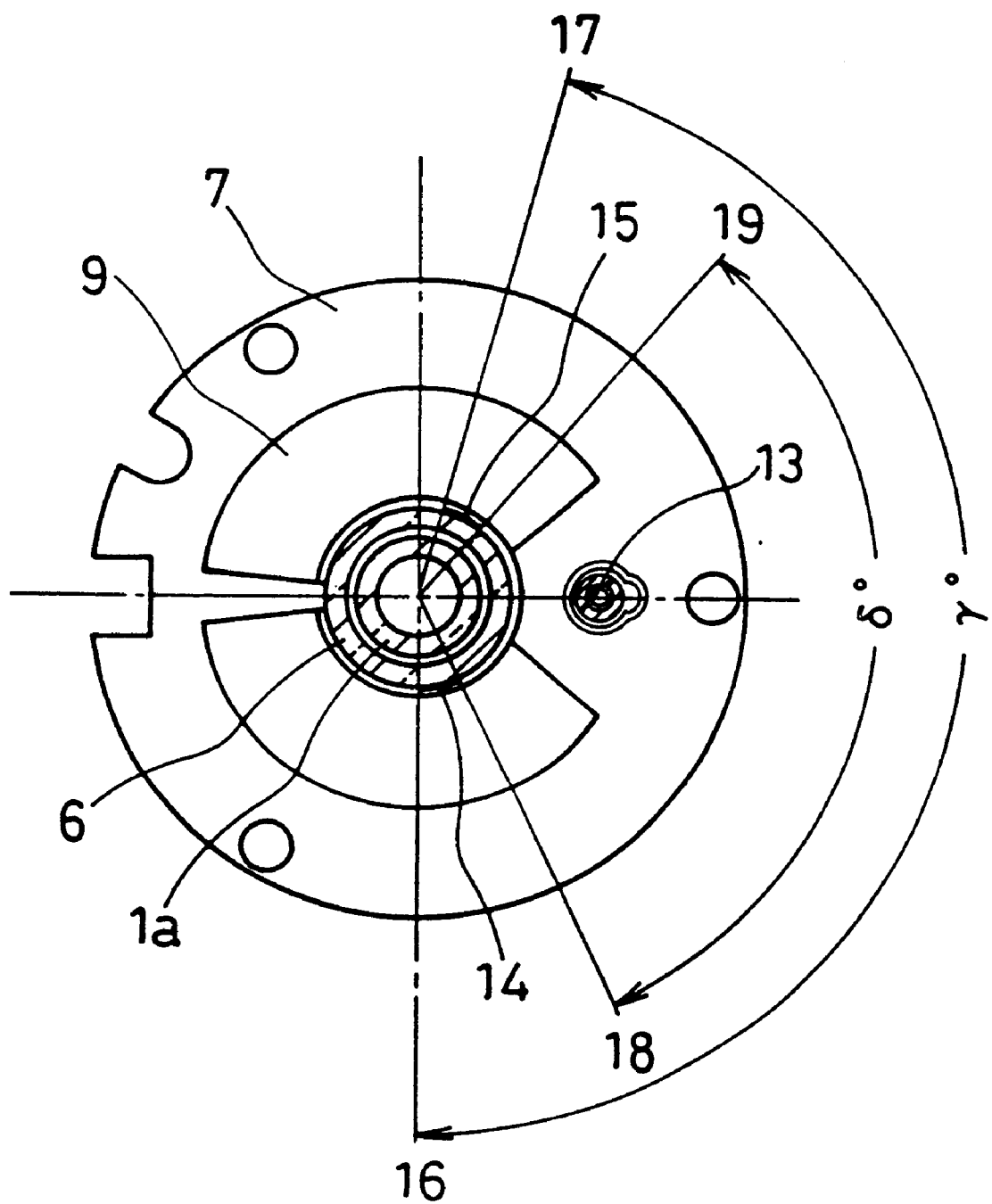
FIG. 3 is a cross sectional view taken along the line I—I of FIG. 1 as seen in the arrow direction.

FIG. 1 is a front view of a metal halide lamp for a 35W automobile headlight in one embodiment of the present invention. FIG. 2 is a front view in section taken along a plane that includes the axis 21 of the arc tube of the metal halide lamp in FIG. 1. FIG. 3 is a cross sectional view taken along the line I—I of FIG. 1 as seen in the arrow direction. In FIG. 1, internal structures visible through transparent members are depicted by solid lines.

As shown in FIGS. 1 and 2, the discharge lamp in this embodiment comprises an arc tube 1 in which a pair of electrodes 2 are provided. The arc tube 1 has a light-emitting portion 1a, in which mercury, $ScI_3$ and NaI as metal halides, and xenon as a starting gas are enclosed, and a pair of flattened sealing portions 1b, which are provided at both ends of the light-emitting portion 1a continuously. A metal foil 4 whose one end is connected to one end of the electrode 2 and whose other end is connected to one end of an outer lead 3 is sealed in each sealing portion 1b so that the electrode 2 is located in the light-emitting portion 1a.

A cylindrical portion 5 is provided next to at least one of the sealing portions 1b of the arc tube 1 continuously as shown in FIG. 2. The outer lead 3 is led out from the sealing portion 1b through the cylindrical portion 5.

The arc tube 1 is provided in an outer tube 6. The ends of the outer tube 6 are sealed at the sealing portion 1b of the arc tube 1 and the cylindrical portion 5.

The end of the arc tube 1 on the side of the cylindrical portion 5 is inserted into a hole 8 provided in the center of a base 7 made of a resin such as polyetherimide so that the arc tube 1 is fixed to the base 7 by a support 9 made of a metal and the outer tube 6.

The outer tube 6 is fixed to the base by the support 9. The outer lead 3 led out of one sealing portion 1b is extended from the base 7 and connected to a power supply line 13 located on a lateral of the outer tube 6.

Second shading films 14 and 15 that are belt-shaped are formed on the outer surface of the outer tube 6 in a region that faces the power supply line 13 and is near the electrode 2, as shown in FIGS. 1–3. In FIGS. 1 and 2, the shading film whose outline is depicted by the solid line is formed on the outer surface of the outer tube 6 on the front side, and the shading film whose outline is depicted by the dotted line is formed on the outer surface of the outer tube 6 on the back side. The shading films 14 and 15 face each other at a distance. As shown in FIG. 3, when the shading film 14 is formed on the outer surface of the outer tube 6 between ends 16 and 18 and the shading film 15 is formed on the outer surface of the outer tube 6 between ends 17 and 19, the ends 16 and 17 form an angle γ of 165 degrees and the ends 18 and 19 form an angle δ of 105 to 125 degrees within the angle γ in this embodiment. The apexes of the angles γ and δ are positioned on the axis 21 of the arc tube.

As shown in FIGS. 1 and 2, a first shading film 20 is formed on the outer surface of the outer tube 6 in a region that does not face the power supply line 13 and corresponds to at least one of the sealing portions 1b. In this embodiment, the first shading film 20 extends from the position that forms an angle α of 45 degrees with the line that is perpendicular to the outer tube 6 at the central point between the pair of the electrodes 2 to the position that forms an angle β of at least 70 degrees with the perpendicular line, on the outer surface of the outer tube 6 in a region that does not face the power supply line 13, as shown in FIG. 1. The apexes of the angles α and β are on the axis 21 of the arc tube 1. When the shading film is formed in this position, only effective light enters a reflector. Then, the light becomes a beam to be projected outside in front of a headlight through a headlight lens.

As the materials of the shading film, a glass frit for fixing to glass and a metal oxide of iron that is a black inorganic pigment for obtaining a shading property are used. However, the black inorganic pigment is not limited to the metal oxide of iron. A monometal, such as manganese, copper, chromium, or cobalt; an oxide of these monometals; an alloy of these metals; a composite metal oxide comprising two or more metals; or a mixture comprising two or more monometal oxides may be used. For example, $Fe_2O_3$, $Fe_3O_4$, $MnO_2$, $CuO$, $Cr_2O_3$, or $CoO$ can be used. In addition, the inorganic pigment for obtaining a shading property is not limited to the black inorganic pigment. A red pigment, a blue pigment or the like may be used.

Next, a method for manufacturing a lamp in one embodiment of the present invention will be described by way of a method for manufacturing the discharge lamp shown in FIG. 1.

Figure 4:
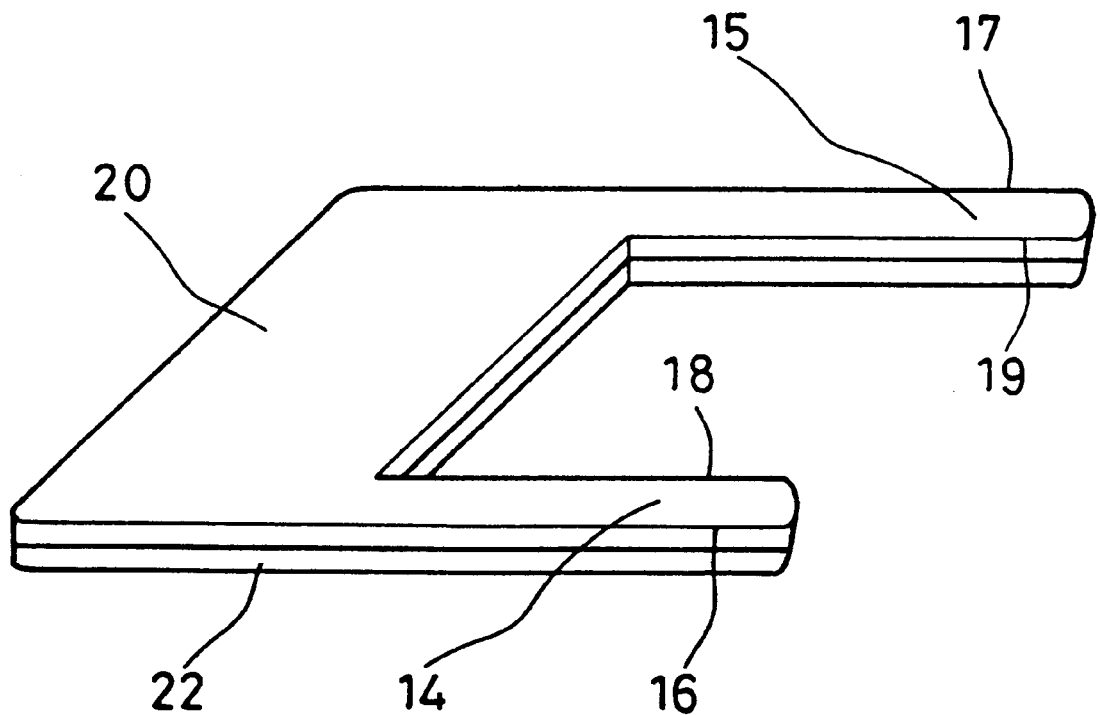
FIG. 4 is a perspective view schematically showing the outline shape of a greensheet used for manufacturing the discharge lamp of FIG. 1.

The shading films 14, 15 and 20 are fixed to the outer surface of the outer tube 6 by cutting (patterning) a flexible solid greensheet whose one surface is coated with an adhesive 22 into a concave shape so that the shading films 14, 15 and 20 are integrated, as shown in FIG. 4, and applying the cut greensheet in the predetermined position as described above, in such a manner that the adhesive 22 is located on the outer surface of the outer tube 6.

The solid greensheet is manufactured, for example, as follows. First, a glass frit and an inorganic pigment, which are the materials of the shading film, and an organic binder component (for example, polyvinyl alcohol) for obtaining the strength and flexibility of the sheet are kneaded uniformly into a paste by a roll mill. Then, the mold-releasing surface of a first mold-releasing film (for example, a polyethylene terephthalate film) is coated with the paste by a doctor blade type coater to form a coating film having a thickness of preferably 10 to 100 μm (for example, about 20 μm). Then, the coating film is rolled around a roll together with the first mold-releasing film and coated with an acrylic resin-based adhesive by a gravure coater. The adhesive is dried to form an adhesive layer having a thickness of about 10 μm. Then, a second mold-releasing film (for example, a polyethylene terephthalate film) is layered on the adhesive layer. Thus, a greensheet can be obtained.

The greensheet applied to the outer tube 6 preferably is calcined in an oxidative atmosphere at a temperature of 200 to 600° C. The adhesive and the organic binder component are removed by the calcination. Furthermore, the greensheet preferably is fired in an oxidative atmosphere at a temperature of 600 to 1,500° C. (for example, 800° C.). Thus, the glass frit that is used for the shading film melts and is welded to the outer tube 6, containing the inorganic pigment. The inorganic pigment is not changed by the firing, so that good fixing can be achieved.

Figure 5:
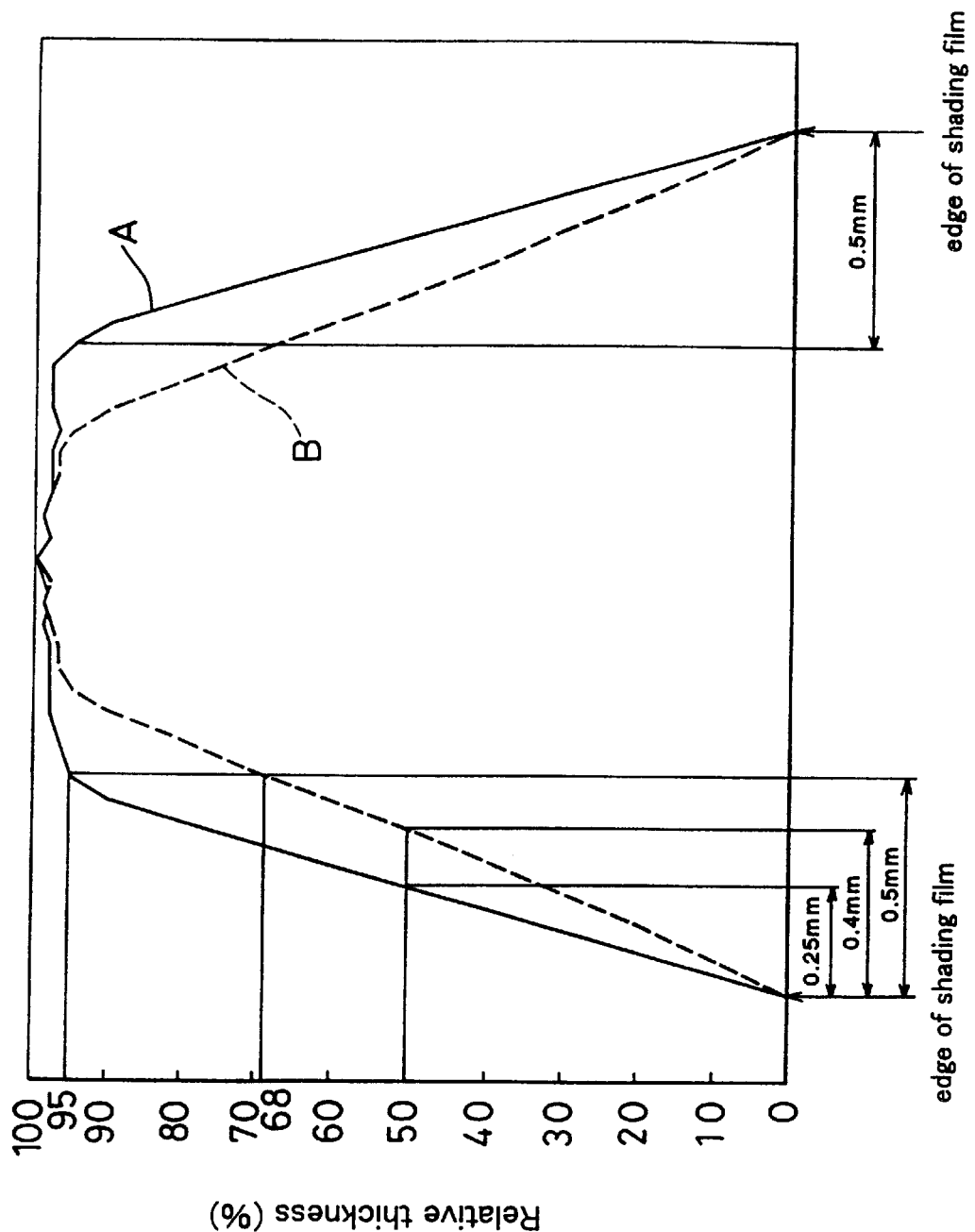
FIG. 5 shows an example of a thickness distribution of the shading film used in the discharge lamp in the one embodiment of the present invention on the cross section taken along the line I—I of FIG. 1 in the arrow direction and an example of a thickness distribution of a similar conventional shading film formed by using a brush or an ink jet.

FIG. 5 shows an example of a thickness distribution of the shading film 14 in the circumferential direction of the outer tube 6 on the cross section taken along the line I—I of FIG. 1 in the arrow direction and an example of a thickness distribution of a similar conventional shading film formed by using a brush or an ink jet. The solid line A indicates the thickness distribution of the shading film of the present invention, and the dotted line B indicates the thickness distribution of the conventional shading film formed by using a brush or an ink jet. The vertical axis indicates a relative thickness (%) when the maximum thickness of each shading film is 100%. The horizontal axis indicates a position in the circumferential direction of the outer tube 6 on the cross section taken along the line I—I in the arrow direction.

Figure 6:
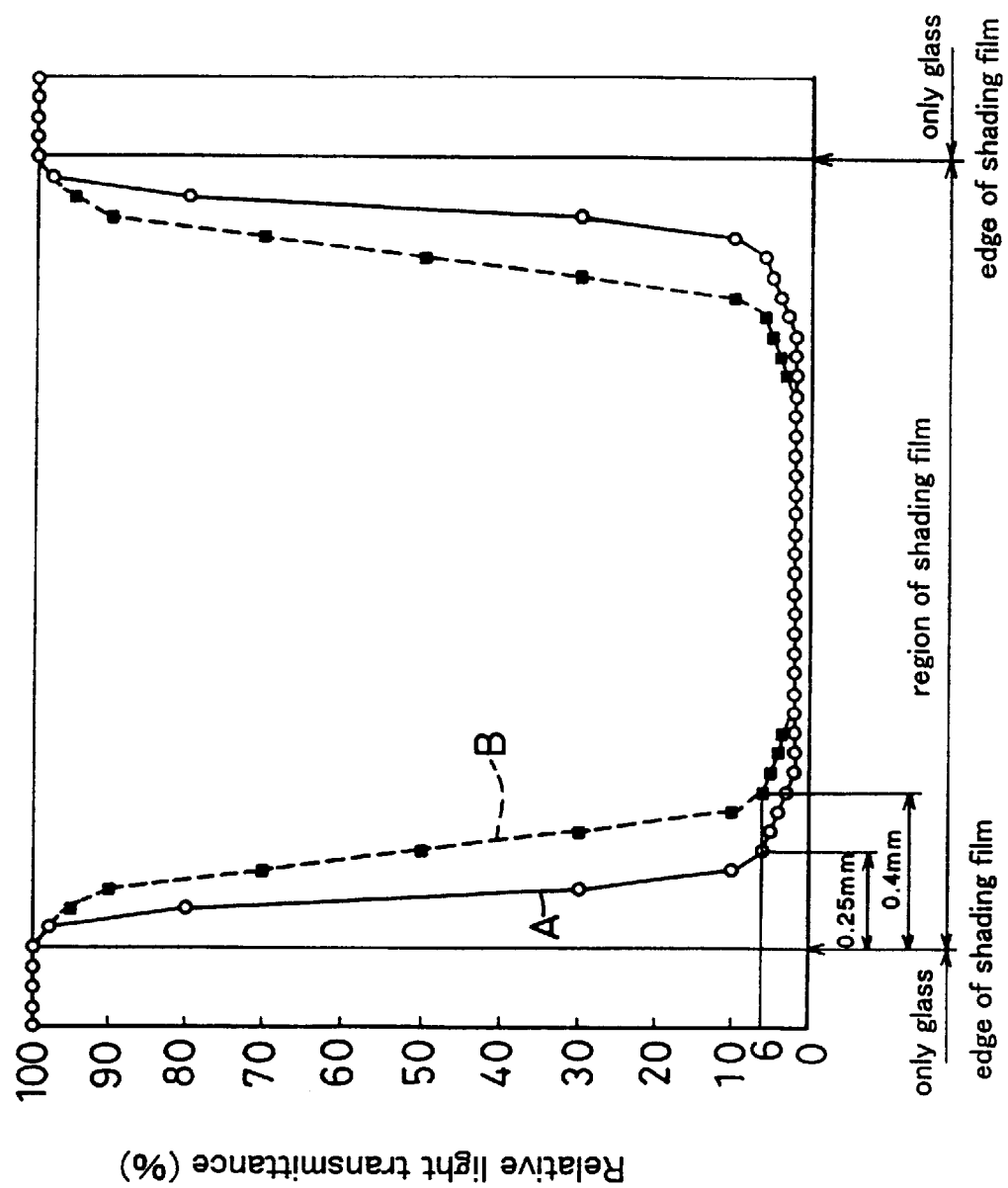
FIG. 6 shows light transmittance curves of the shading films in FIG. 5.

FIG. 6 shows light transmittance curves of the shading films in FIG. 5. The solid line A indicates the transmittance curve of the shading film of the present invention, and the dotted line B indicates the transmittance curve of the conventional shading film formed by using a brush or an ink jet. The vertical axis indicates a relative light transmittance (%) when the light transmittance of the region where the shading film is not formed (the region of only the outer tube 6 made of glass) is 100%. The horizontal axis indicates a position in the circumferential direction of the outer tube 6 on the cross section taken along the line I—I in the arrow direction.

In the shading film of the present invention shown by the solid line A in FIGS. 5 and 6, a metal oxide of iron is used as the inorganic pigment, a glass frit is used as the inorganic matrix component, and 100 parts by weight of the inorganic pigment and 60 parts by weight of the inorganic matrix component are mixed.

As is apparent from FIG. 5, the shading film of the present invention has a portion whose thickness is 90% or more of the maximum thickness of the shading film within the range of 0.5 mm from an edge of the shading film. On the other hand, the conventional shading film formed by a brush or ink jet method has a thickness of only 68% of the maximum thickness even at the point that is 0.5 mm inside from an edge of the shading film. This indicates that the border portion (the end face) of the shading film for the lamp of the present invention is steeper (has a sharper edge structure) than that of the shading film for the conventional lamp so that the border is more distinct. In the lamp of the present invention, by forming the shading film in such a manner that the thickness of the shading film is 90% or more of the maximum thickness at the point that is 0.5 mm inside from an edge of the shading film, the light contrast can be made clearer at the edges of the shading film. On the other hand, in the conventional shading film, the edge portion of the shading film becomes dim so that a highly precise light distribution property cannot be achieved.

In general, in order to obtain a practical shading property, the light transmittance of the shading film should be preferably 6% or less of that of the portion without the shading film. In the transmittance curves of FIG. 6, the light transmittances of the shading films are 6% or less of those of the regions where the shading film is not formed at the point that is 0.25 mm inside from an edge of the shading film in the present invention and at the point that is 0.4 mm inside from an edge of the conventional shading film. FIG. 5 indicates that the relative thicknesses at these points are each 50%. That is, a good shading property can be obtained by maintaining the thickness of the shading film at 50% or more of the maximum thickness constantly in the range of 0.5 mm and more inside from the edge of the shading film, even considering a nonuniformity in thickness. More specifically, when the average thickness of the shading film in this range is 10 to 100 μm, a good shading property is easily obtained.

As described above, the shading film of the lamp of the present invention has a portion whose thickness is 90% or more of the maximum thickness of the shading film within the range of 0.5 mm from an edge of the shading film. Preferably, the thickness of the shading film is 50% or more of the maximum thickness in the range of 0.5 mm and more inside from the edge of the shading film. Thus, the outline of the light contrast portion becomes clear, and a good shading property can be maintained. Such a shading film can be obtained easily by applying a solid greensheet having a substantially uniform thickness in a predetermined position and firing the greensheet for fixing. The concave greensheet shown in FIG. 4 can always be cut into the same shape and applied to a predetermined position. Therefore, the shading film using the greensheet can be manufactured with good productivity and at a lower cost than the conventional shading film. In addition, the shading film can be formed with a good positional accuracy by forming an adhesive layer on one surface of the greensheet without providing another special fixing means while the greensheet is fired for fixing.

In addition, the present invention can be applied to any lamp that requires a shading film, for example, a tungsten halogen lamp, with the same effect.

In the above embodiment, the shading film is provided on the outer surface of the outer tube. However, the same effect can be obtained by providing the shading film on at least one of the outer and inner surfaces of the arc tube or by providing the shading film on at least one of the outer and inner surfaces of the outer tube. Furthermore, the shading film may be provided on both the outer tube and the arc tube.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for manufacturing a lamp including a glass substrate and a shading film formed on a surface of the glass substrate, comprising:

applying a greensheet that comprises an inorganic pigment and an inorganic matrix component and is patterned into a predetermined shape to a surface of a glass substrate; and firing the greensheet so that the greensheet is integrated with the surface of the glass substrate, thereby forming a shading film.

2. The method for manufacturing a lamp according to claim 1, wherein the inorganic matrix component is a glass frit.

3. The method for manufacturing a lamp according to claim 1, wherein the firing comprises calcination and main firing.

4. The method for manufacturing a lamp according to claim 3, wherein the calcination is performed in a temperature range for removing an organic component in the greensheet.

5. The method for manufacturing a lamp according to claim 3, wherein the calcination is performed in an oxidative atmosphere at a temperature of 200 to 600° C.

6. The method for manufacturing a lamp according to claim 3, wherein the main firing is performed in an oxidative atmosphere at a temperature of 600 to 1,500° C.

7. The method for manufacturing a lamp according to claim 1, wherein at least one surface of the greensheet is coated with an adhesive.

8. The method for manufacturing a lamp according to claim 1, wherein an average thickness of the greensheet is in the range of 10 to 100 μm.

* * * * *